United States Patent
Choi et al.

(10) Patent No.: US 10,978,250 B2
(45) Date of Patent: Apr. 13, 2021

(54) METHOD OF MANUFACTURING CAPACITOR

(71) Applicant: SAMSUNG ELECTRO-MECHANICS CO., LTD., Suwon-Si (KR)

(72) Inventors: Hye Young Choi, Suwon-Si (KR); Jae Yeol Choi, Suwon-Si (KR); Hyun Hee Gu, Suwon-Si (KR); Bum Su Kim, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 313 days.

(21) Appl. No.: 15/944,376

(22) Filed: Apr. 3, 2018

(65) Prior Publication Data
US 2018/0226192 A1 Aug. 9, 2018

Related U.S. Application Data

(62) Division of application No. 15/296,695, filed on Oct. 18, 2016, now Pat. No. 10,062,506.

(30) Foreign Application Priority Data

Mar. 22, 2016 (KR) .................. 10-2016-0033906

(51) Int. Cl.
*H01G 7/06* (2006.01)
*H01G 4/30* (2006.01)
(Continued)

(52) U.S. Cl.
CPC ............... *H01G 4/30* (2013.01); *H01G 4/012* (2013.01); *H01G 4/232* (2013.01)

(58) Field of Classification Search
CPC ........ H01G 4/005; H01G 4/012; H01G 4/232; H01G 4/30
See application file for complete search history.

(56) References Cited

U.S. PATENT DOCUMENTS 9,536,662 B2 * 1/2017 Kim ..................... H01G 4/005
9,922,770 B2 * 3/2018 Zaima ................... H01G 4/30
(Continued)

FOREIGN PATENT DOCUMENTS

| JP | 10-289837 A | 10/1998 |
| JP | 2003-7566 A | 1/2003 |

(Continued)

OTHER PUBLICATIONS

Notice of Allowance issued in related parent U.S. Appl. No. 15/296,695, dated May 23, 2018.
(Continued)

*Primary Examiner* — Paul D Kim
(74) *Attorney, Agent, or Firm* — Morgan, Lewis & Bockius LLP

(57) ABSTRACT

A capacitor includes a body having a first surface, a second surface, and a third surface and a fourth surface connecting the first surface to the second surface, and including a first internal electrode and a second internal electrode respectively having a first lead portion and a second lead portion exposed to the second surface, a first external electrode and a second external electrode formed on the second surface of the body, and electrically connected to the first internal electrode and the second internal electrode, respectively, and dummy electrodes formed on the third surface and the fourth surface of the body and extending from edges at which the second surface meets the third surface and the fourth surface.

20 Claims, 6 Drawing Sheets

(51) Int. Cl.
*H01G 4/012* (2006.01)
*H01G 4/232* (2006.01)

(56) References Cited

U.S. PATENT DOCUMENTS

| | | |
|---|---|---|
| 10,109,423 B2* | 10/2018 | Katsuyama .............. H01G 4/30 |
| 10,522,290 B2* | 12/2019 | Ota ..................... H01F 27/2804 |
| 2012/0314338 A1 | 12/2012 | Togashi |
| 2013/0050893 A1 | 2/2013 | Kim |
| 2015/0083477 A1 | 3/2015 | Lee et al. |
| 2017/0162328 A1 | 6/2017 | Ota |

FOREIGN PATENT DOCUMENTS

| | | |
|---|---|---|
| JP | 2011-228326 A | 11/2011 |
| JP | 2013-4569 A | 1/2013 |
| JP | 2013-46051 A | 3/2013 |
| KR | 10-2015-0033520 A | 4/2015 |

OTHER PUBLICATIONS

Non-Final Office Action issued in related U.S. Appl. No. 15/296,695, dated Jan. 11, 2018.

Office Action issued in corresponding Japanese Application No. 2016-207287 dated Jun. 16, 2020, with English translation.

* cited by examiner

METHOD OF MANUFACTURING CAPACITOR

CROSS-REFERENCE TO RELATED APPLICATION

This application is a Divisional of U.S. patent application Ser. No. 15/296,695, filed Oct. 18, 2016, now U.S. Pat. No. 10,062,506, which claims the benefit of priority to Korean Patent Application No. 10-2016-0033906 filed on Mar. 22, 2016, with the Korean Intellectual Property Office, the entirety of which are incorporated herein by reference.

TECHNICAL FIELD

The present disclosure relates to a capacitor and a method of manufacturing the same.

BACKGROUND

As levels of performance of miniaturized IT products have improved, small products having ultra high capacitance have been required. A Bottom Land Ceramic Capacitor (BLCC) in which an external electrode is formed on a mounting surface has been studied as a new element instead of a Multilayer Ceramic Capacitor (MLCC) according to the related art. As the external electrode is formed on the mounting surface, a distance thereof in a length direction may be increased, and a region in which an internal electrode for the implementation of capacitance is formed may be increased. Therefore, an overlap region is increased to maximize capacitance within a capacitor having the same size. In addition, effects of reducing acoustic noise and improving properties such as flexural strength, and the like, may be secured.

However, there may be limitations, since an external electrode may only be formed on a mounting surface of a hexahedral body. In detail, when mounting a capacitor, a direction of a mounting surface on which the external electrode is formed is selected to mount the capacitor, and thus, production workability and convenience of consumer use may be reduced. In addition, an area of soldering is reduced in comparison with MLCC according to the related art, and thus, adhesion strength with a mounting substrate may be reduced.

Therefore, a capacitor having a structure in which production workability and adhesion strength with respect to amounting substrate are improved, is required to be developed.

SUMMARY

An external electrode formed only on amounting surface may have a problem in that adhesion strength may be weak due to a reduction in a soldering area when the external electrode is mounted on a circuit board.

An exemplary embodiment in the present disclosure provides a capacitor in which a dummy electrode is formed on a surface of a body to improve adhesion strength with a circuit board when the capacitor is mounted on the circuit board.

According to an exemplary embodiment in the present disclosure, a capacitor includes: a body having a first surface, a second surface, and a third surface and a fourth surface connecting the first surface to the second surface, and including a first internal electrode and a second internal electrode respectively having a first lead portion and a second lead portion exposed to the second surface; a first external electrode and a second external electrode formed on the second surface of the body, and electrically connected to the first internal electrode and the second internal electrode, respectively; and dummy electrodes formed on the third surface and the fourth surface of the body and extending from edges at which the second surface meets the third surface and the fourth surface. Thus, capacitance may be significantly increased and adhesion strength with a circuit board may be improved.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
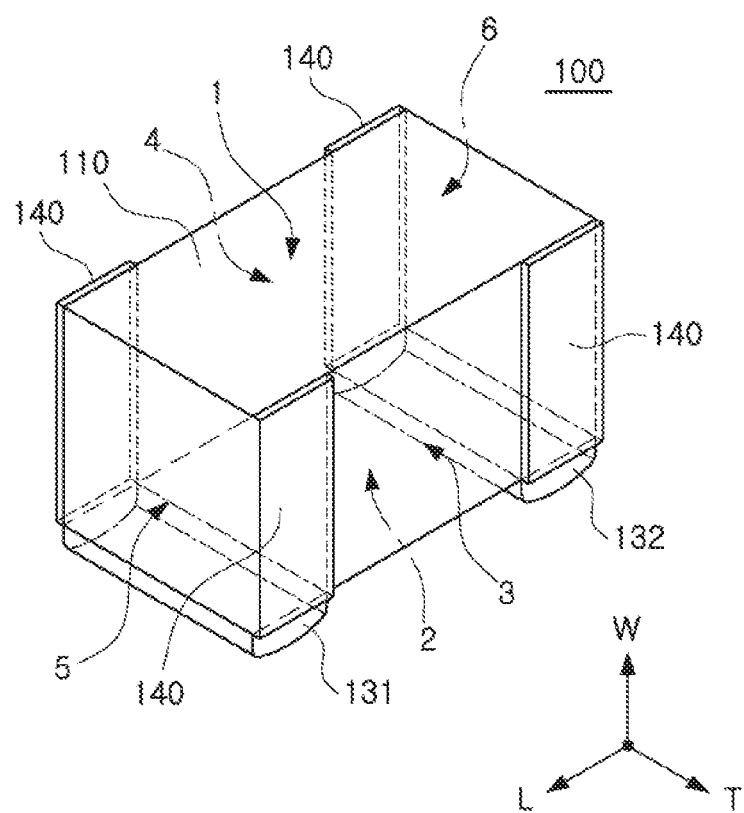
FIG. 1 is a perspective view schematically illustrating a capacitor according to an exemplary embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Hereinafter, a capacitor according to an exemplary embodiment will be described.

Figure 2:
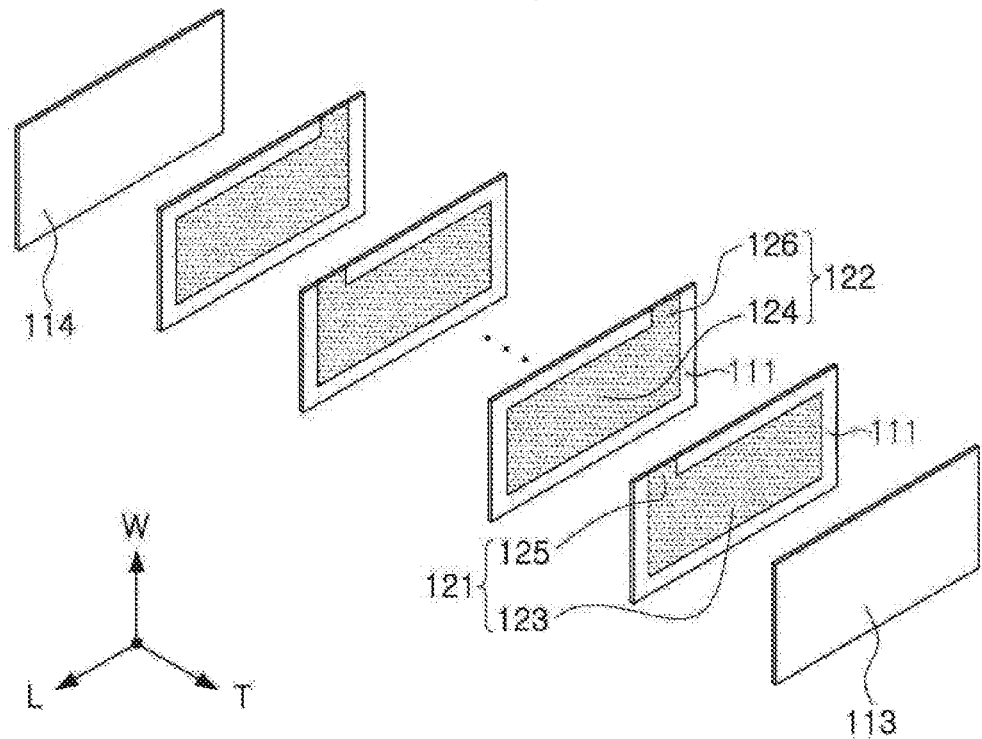
FIG. 2 is an exploded view schematically illustrating a body according to an exemplary embodiment.

FIG. 1 is a perspective view schematically illustrating a capacitor according to an exemplary embodiment, and FIG. 2 is an exploded view schematically illustrating a body according to an exemplary embodiment.

With reference to FIGS. 1 and 2, a capacitor 100 according to an exemplary embodiment may include a body 110 having a first surface 1, a second surface 2, and a third surface 3 and a fourth surface 4 connecting the first surface to the second surface, and including a first internal electrode 121 and a second internal electrode 122 respectively having a first lead portion 125 and a second lead portion 126 exposed to the second surface 2, a first external electrode 131 and a second external electrode 132 formed on the second surface 2 of the body, and electrically connected to the first internal electrode 121 and the second internal electrode 122, respectively, and dummy electrodes 140 formed on the third surface 3 and the fourth surface 4 of the body and extending from edges at which the second surface 2 meets the third surface 3 and the fourth surface 4.

The body 110 may have a hexahedral form having the first surface 1 and the second surface 2 opposing each other in a width (W) direction, the third surface 3 and the fourth surface 4 opposing each other in a dielectric layer stacking direction, a thickness (T) direction, and a fifth surface 5 and a sixth surface 6 opposing each other in a length (L) direction, but is not limited thereto.

The first surface and the second surface of the body may correspond to an upper surface and a lower surface of the body, respectively.

The body may have an upper surface, a lower surface, and two lateral surfaces connecting the upper surface to the lower surface and opposing each other in a dielectric layer stacking direction, and may include a first internal electrode and a second internal electrode having a first lead portion and a second lead portion formed to be exposed to the lower surface. The lower surface of the body may correspond to the second surface of the body, and may be a mounting surface disposed on a mounting area of a circuit board.

The body 110 may be formed by stacking a plurality of dielectric layers 111 and dielectric cover layers 113 and 114.

The plurality of dielectric layers 111 and the dielectric cover layers 113 and 114 forming the body 110 are in a sintered state. In addition, as adjacent dielectric layers may be integrated with each other, boundaries therebetween may not be able to be confirmed with the naked eye.

The dielectric layer may be formed by sintering a dielectric layer including a ceramic powder, an organic solvent, and an organic binder. The ceramic powder, a material having a high dielectric constant, may include a perovskite material. The perovskite material may be a barium titanate ($BaTiO_3$)-based material, a strontium titanate ($SrTiO_3$)-based material, or the like, but is not limited thereto.

Internal electrodes 121 and 122 may be formed inside the body 110. The internal electrodes may include a pair of a first internal electrode 121 having a first polarity and a second internal electrode 122 having a second polarity, and may be stacked to oppose each other with a single dielectric layer interposed therebetween.

The first internal electrode 121 and the second internal electrode 122 may be disposed to be perpendicular to the second surface, a mounting surface of the capacitor.

The first internal electrode 121 and the second internal electrode 122 may be formed of a conductive paste including a metallic material. The metallic material may be nickel (Ni), copper (Cu), palladium (Pd), or alloys thereof, but is not limited thereto.

The first internal electrode and the second internal electrode may be printed on a dielectric material forming the dielectric layer using the conductive paste through a printing method such as a screen printing method or a gravure printing method.

The dielectric layers on which the first internal electrode and the second internal electrode are printed may be alternately stacked and sintered to form the body.

In an exemplary embodiment, the first polarity and the second polarity may be polarities different from each other.

The first internal electrode 121 and the second internal electrode 122 may respectively have the first lead portion 125 and the second lead portion 126 exposed to the second surface of the body.

A capacitor according to the related art has a structure in which a first internal electrode and a second internal electrode are exposed to both lateral surfaces connecting a first surface to a second surface of a body, respectively. However, a capacitor according to an exemplary embodiment has a structure in which a first internal electrode and a second internal electrode are exposed to a second surface of a body. The structure thereof may allow for high capacitance to be achieved in the capacitor, as an area of a region in which internal electrodes are overlapped may be increased in comparison with the capacitor according to the related art.

In the capacitor according to an exemplary embodiment, the internal electrodes may be vertically stacked-type internal electrodes.

The first lead portion 125 and the second lead portion 126 may be areas exposed to the second surface of the body as a distance is increased in a width (W) direction on an internal electrode pattern formed of the first internal electrode and the second internal electrode. The first lead portion and the second lead portion may be provided as an area in which widths thereof are increased in a region in which the internal electrodes are overlapped, and lengths thereof are smaller than a length of a region in which the internal electrodes are overlapped.

The first internal electrode 121 and the second internal electrode 122 may form electrostatic capacitance by overlap regions 123 and 124, and the first lead portion 125 and the second lead portion 126 respectively connected to the first external electrode 131 and the second external electrode 132 having polarities different from each other may not have an overlap region.

The first lead portion 125 and the second lead portion 126 are not overlapped but are insulated. Thus, the first lead portion and the second lead portion may reduce the occurrence of short defects between internal electrodes caused by a slip phenomenon of the internal electrodes opposing each other, occurring due to cutting stress when a stack is cut to form a body.

With reference to FIG. 2, the first lead portion and the second lead portion of the first internal electrode 121 and the second internal electrode 122 are alternately exposed to the second surface of the body 110, in other words, a lower surface thereof.

In addition, the first internal electrode 121 and the second internal electrode 122 are spaced apart from edges of the second surface of the body 110 by a predetermined distance.

With reference to FIG. 1, the capacitor according to an exemplary embodiment may include the first external electrode 131 connected to the first lead portion 125 of the first internal electrode led out to the second surface 2 of the body 110, and the second external electrode 132 connected to the second lead portion 126 of the second internal electrode led out to the second surface 2 of the body 110. In other words, the first external electrode 131 and the second external electrode 132 may be formed on the second surface 2 of the body 110, in other words, on a lower surface thereof.

The first external electrode 131 and the second external electrode 132 may be formed to edges at which the second surface 2 of the body 110 meets the third surface 3 and the fourth surface 4.

The first external electrode 131 and the second external electrode 132 may be formed to edges at which the second surface 2 of the body 110 meets the fifth surface 5 and the sixth surface 6, or may be formed to be spaced apart from the edges.

A distance between the first external electrode 131 and the second external electrode 132 may be 30 μm to 40 μm or more, and thus, a short between the first external electrode 131 and the second external electrode 132 may be prevented.

The first external electrode 131 and the second external electrode 132 may include a metallic material.

The metallic material may be nickel (Ni), copper (Cu), tin (Sn), or alloys thereof.

The first external electrode 131 and the second external electrode 132 may further include an insulating material. For example, the insulating material may be a glass.

The first external electrode 131 and the second external electrode 132 may be formed on the second surface 2 of the body 110 to be connected to the first lead portion 125 and the second lead portion 126, respectively.

When the first external electrode and the second external electrode are formed only on the second surface of the body, a solder fillet may allow a size of a protruding portion, in comparison with the body, to be reduced, and a size of the capacitor may be increased by an amount equal to an amount by which the protruding portion is reduced. Thus, capacitance maximizing effects in comparison with a body having the same size may be obtained. However, in a case of the capacitor including the first external electrode and the second external electrode formed only on the second surface of the body, an area in which a circuit board is in contact with the solder fillet is reduced, adhesion strength with the circuit board may be reduced.

Figure 3A:
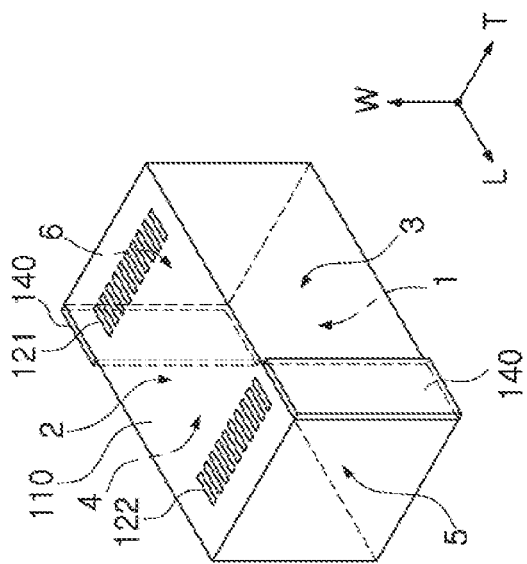
FIGS. 3A through 3D are perspective views schematically illustrating a body according to an exemplary embodiment.
Figure 3B:
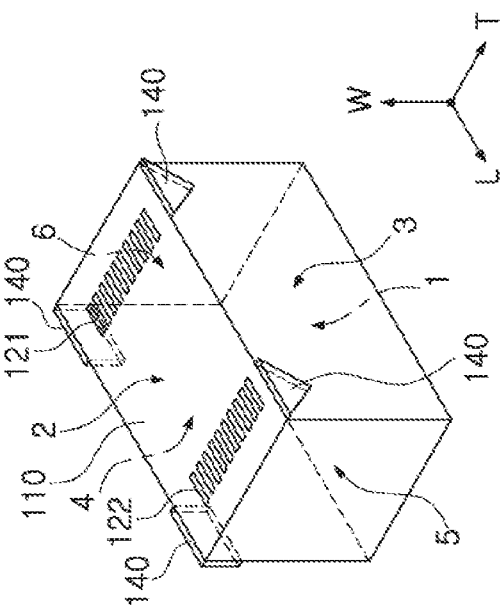
Figure 3C:
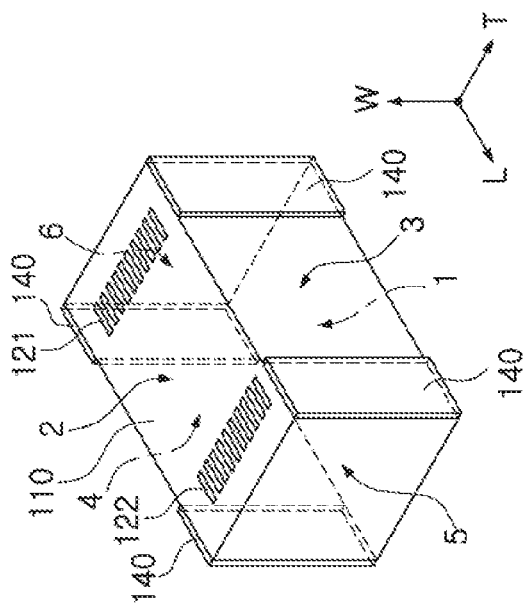
Figure 3D:
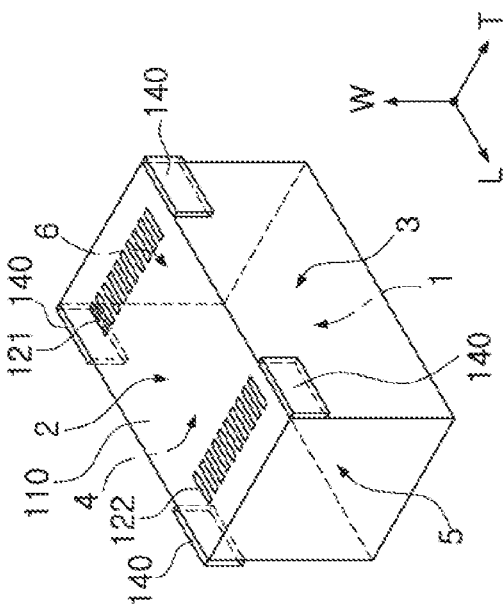
Figure 4:
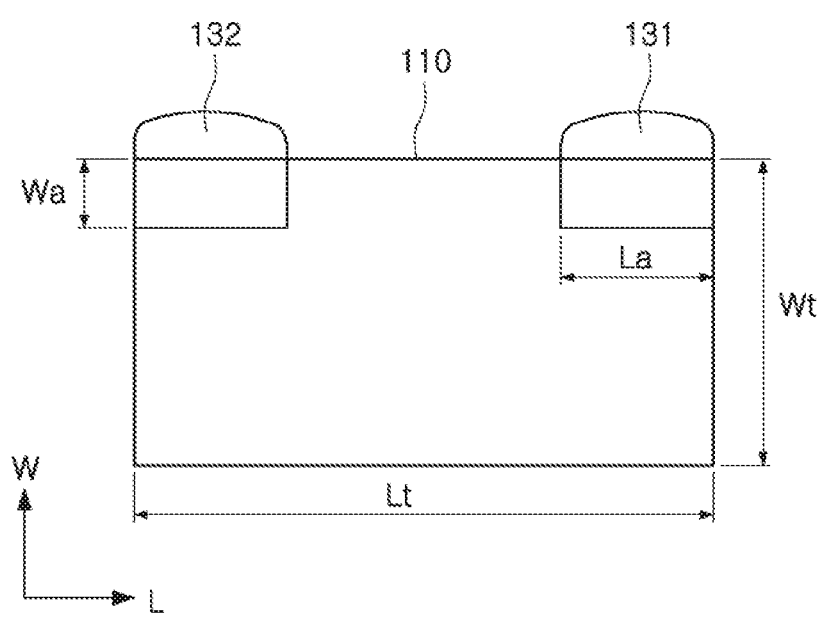
FIG. 4 and FIGS. 5A through 5F are front views schematically illustrating a body according to an exemplary embodiment.

FIGS. 3A through 3D are a perspective view schematically illustrating a body according to an exemplary embodiment, and FIGS. 4 and 5 are front views schematically illustrating a body according to an exemplary embodiment.

With reference to FIGS. 3 to 5, the capacitor according to an exemplary embodiment may include the dummy electrodes 140 formed on the third surface 3 and the fourth surface 4 of the body, and extending from edges at which the second surface 2 of the body 110 meets the third surface 3 and the fourth surface 4. In other words, the dummy electrodes are formed on both surfaces of the body 110.

As the dummy electrodes are included therein, an area in which a conductive material is formed on a surface of the body may be increased to easily form a plating layer. Thus, capacitance of a capacitor may be significantly increased and adhesion strength with the circuit board may be increased simultaneously. In addition, when the capacitor is loaded, workability and convenience may be improved.

The dummy electrodes 140 may be formed of a material the same as that of the first internal electrode 121 and the second internal electrode 122. For example, the material may be nickel (Ni), copper (Cu), palladium (Pd), or alloys thereof, but is not limited thereto.

When the dummy electrode 140 is formed of a material the same as that of an internal electrode, during a process of electrode formation, lateral surfaces of the body may be printed with a conductive paste for an internal electrode to form the dummy electrodes.

The dummy electrodes 140 may serve as a seed layer for formation of a plating layer. In other words, the plating layer may be formed on the first external electrode, the second external electrode, and the dummy electrodes.

The plating layer may be formed on the third surface and the fourth surface of the body, in addition to the first external electrode and the second external electrode. When the capacitor is mounted on the circuit board, an area in which a solder fillet is in contact with the capacitor is increased to improve adhesion strength.

The first external electrode 131 and the second external electrode 132 formed on the second surface of the body may serve as electrodes electrically connected externally, and the dummy electrodes 140 formed on the third surface and the fourth surface of the body may be formed to have a minimal thickness to improve adhesion strength when the dummy electrodes are mounted on the circuit board.

The dummy electrodes 140 may not be directly connected to the internal electrode, and may be indirectly connected to the internal electrode through the first external electrode or the second external electrode.

With reference to FIGS. 3A through 3D, the dummy electrodes 140 may be formed on portions of the third surface 3 and the fourth surface 4 of the body 110.

The dummy electrodes 140 may be formed in positions corresponding to ends of the first external electrode 131 and the second external electrode 132 in the third surface 3 and the fourth surface 4 of the body 110.

The dummy electrodes 140 may be formed on areas adjacent to the first external electrode 131 and the second external electrode 132. When a plating layer is formed, plating layers formed on the first external electrode, the second external electrode, and the dummy electrodes may be provided as a single plating layer.

The dummy electrodes 140 may be provided as two or less dummy electrodes on at least one of the third surface 3 and the fourth surface 3 of the body 110. The dummy electrodes may be provided as two dummy electrodes 140 formed on each of the third surface and the fourth surface of the body, or one dummy electrode 140 formed on each of the third surface and the fourth surface thereof.

With reference to FIG. 3B, when one dummy electrode 140 is formed on each of the third surface 3 and the fourth surface 4 of the body 110, for example, when one dummy electrode 140 is formed in a position corresponding to an end of the second external electrode in the third surface 3 of the body 110, the other dummy electrode 140 may be formed in a position corresponding to an end of the first external electrode in the fourth surface 4 of the body 110. In other words, each of the dummy electrodes 140 formed on the third surface 3 and the fourth surface 4 of the body 110 may be disposed to oppose each other diagonally. In the dummy electrodes 140, a dummy electrode formed on the third surface 3 of the body 110 may have a form different from that of a dummy electrode formed on the fourth surface 4 of the body 110.

With reference to FIG. 3C, the dummy electrodes 140 formed on the third surface 3 and the fourth surface 4 of the body 110 may extend from edges at which the second surface 2 of the body 110 meets the third surface 3 and the fourth surface 4 toward edges at which the first surface 1 of the body 110 meets the third surface 3 and the fourth surface 4. The dummy electrodes 140 may not extend to contact the edges at which the first surface 1 of the body 110 meets the third surface 3 and the fourth surface 4.

With reference to FIG. 3D, dummy electrodes 140 formed on the third surface 3 may be formed to have a triangular shape, and dummy electrodes 140 formed on the fourth surface 4 may be formed to have a rectangular shape.

When the dummy electrode 140 is formed to have a triangular shape, one side of the dummy electrode 140 is formed on edges at which the second surface 2 of the body 110 meets the third surface 3 and the fourth surface 4. In other words, the edges at which the second surface 2 of the body 110 meets the third surface 3 and the fourth surface 4 may correspond to areas adjacent to the first external electrode and the second external electrode.

With reference to FIG. 4, when a length of the body is Lt and lengths of the dummy electrodes, formed on edges at which the second surface of the body meets the third surface and the fourth surface, are La, 10 µm≤La≤(Lt/2)−10 µm. In addition, when a width of the body is Wt and widths of the dummy electrodes are Wa, 10 µm≤Wa≤Wt.

When the length La of the dummy electrode, formed on the edge, and a width Wa thereof are 10 µm or more, an area on which a conductive material is formed, of areas adjacent to the first external electrode and the second external electrode, may be increased.

When two dummy electrodes are formed on each of the third surface and the fourth surface of the body, short defects caused by electrode scattering between the dummy electrodes may occur. Thus, La may be (Lt/2)−10 µm or less.

TABLE 1

| Classification | Wa (µm) | La (µm) | Adhesion strength defect rate (%) of capacitor |
|---|---|---|---|
| 1* | 10 | 1 | 2.5 |
| 2* | 10 | 5 | 1.8 |
| 3 | 10 | 10 | 0.0 |
| 4 | 10 | 50 | 0.0 |
| 5 | 10 | 100 | 0.0 |
| 6* | 1 | 10 | 1.6 |
| 7* | 5 | 10 | 1.9 |
| 8 | 10 | 10 | 0.0 |
| 9 | 50 | 10 | 0.0 |
| 10 | 100 | 0 | 0.0 |

*Comparative example

Table 1 illustrates a defect rate of adhesion strength according to La and Wa of a capacitor. A standard of adhesion strength of the capacitor may be different according to capacitor size. For example, in a 0603-sized capacitor (L: 0.6 mm, W: 0.3 mm), the standard of adhesion strength may be 300 gf.

With reference to Table 1, when La and Wa are 10 µm or less, an adhesion strength defect rate is confirmed to be generated. Even when the dummy electrode is formed, a length and a width, in other words, an area on which a plating layer is to be formed, is not sufficiently large, an adhesion strength defect is confirmed to occur.

With reference to FIGS. 5A through 5F, the dummy electrodes formed on the third surface of the body is described, which is not limited to the dummy electrode formed on the third surface of the body, but applied to the dummy electrode formed on the fourth surface of the body.

Figure 5A:
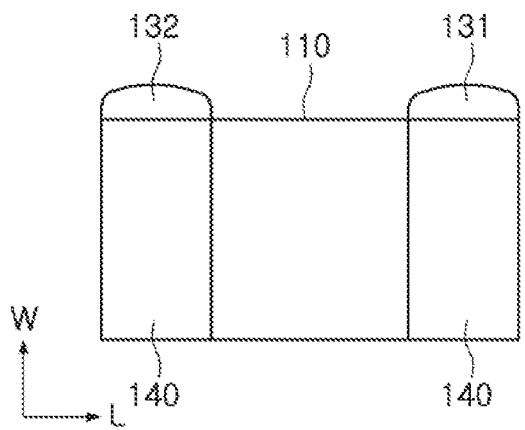
Figure 5B:
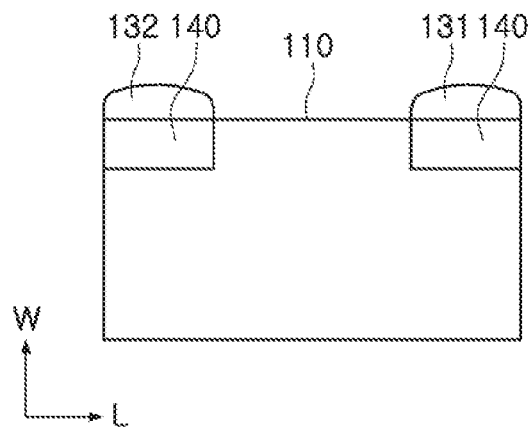
Figure 5C:
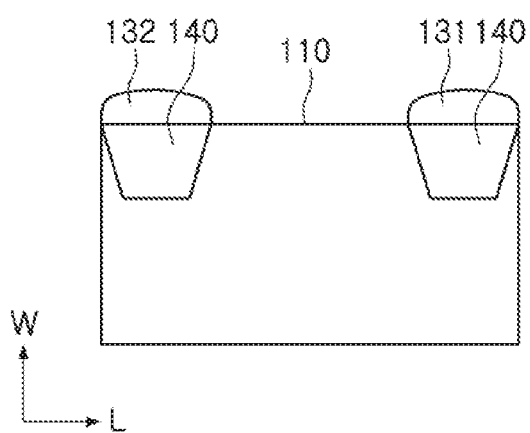
Figure 5D:
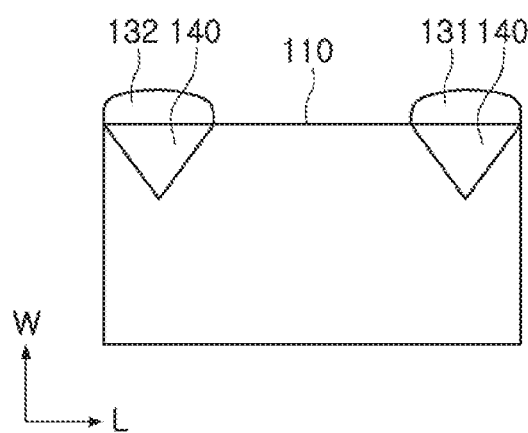
Figure 5E:
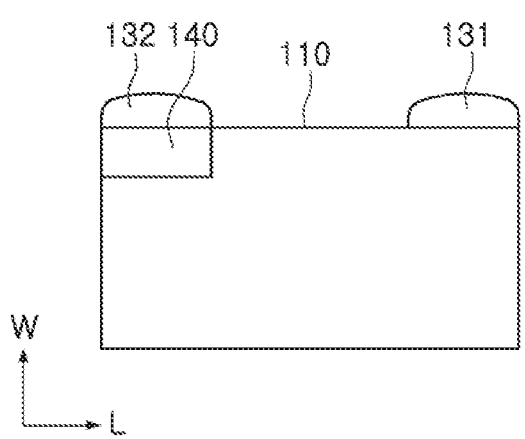
Figure 5F:
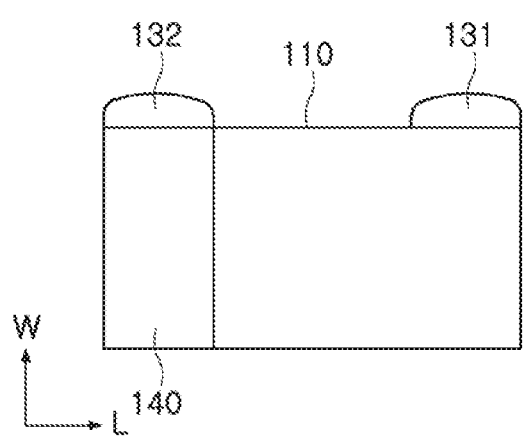

The dummy electrode 140 may be formed to have at least one of a triangular shape (see FIG. 5D), a rectangular shape (see FIGS. 5A, 5B, 5E, and 5F), and a trapezoidal shape (see FIG. 5C).

As described previously, one or two dummy electrodes may be formed on the third surface or the fourth surface of the body, and a width of the dummy electrode may be 10 µm or more.

The dummy electrode 140 may be formed to an edge at which the third surface 3 of the body meets the fifth surface 5 or the sixth surface 6 of the body in a length direction of the body, but is not limited thereto.

The dummy electrode 140 may be formed to have a thickness the same as a thickness of the internal electrode, but a thickness thereof is not limited thereto. The dummy electrode, serving as a seed layer to allow a plating layer to be formed on the third surface and the fourth surface of the body, may be formed to have a minimal thickness less than that of the external electrode.

The plating layer is formed to cover the dummy electrodes, the first external electrode, and the second external electrode. Thus, as capacitance of a capacitor is increased and adhesion strength is increased simultaneously, acoustic noise may be reduced.

Figure 7:
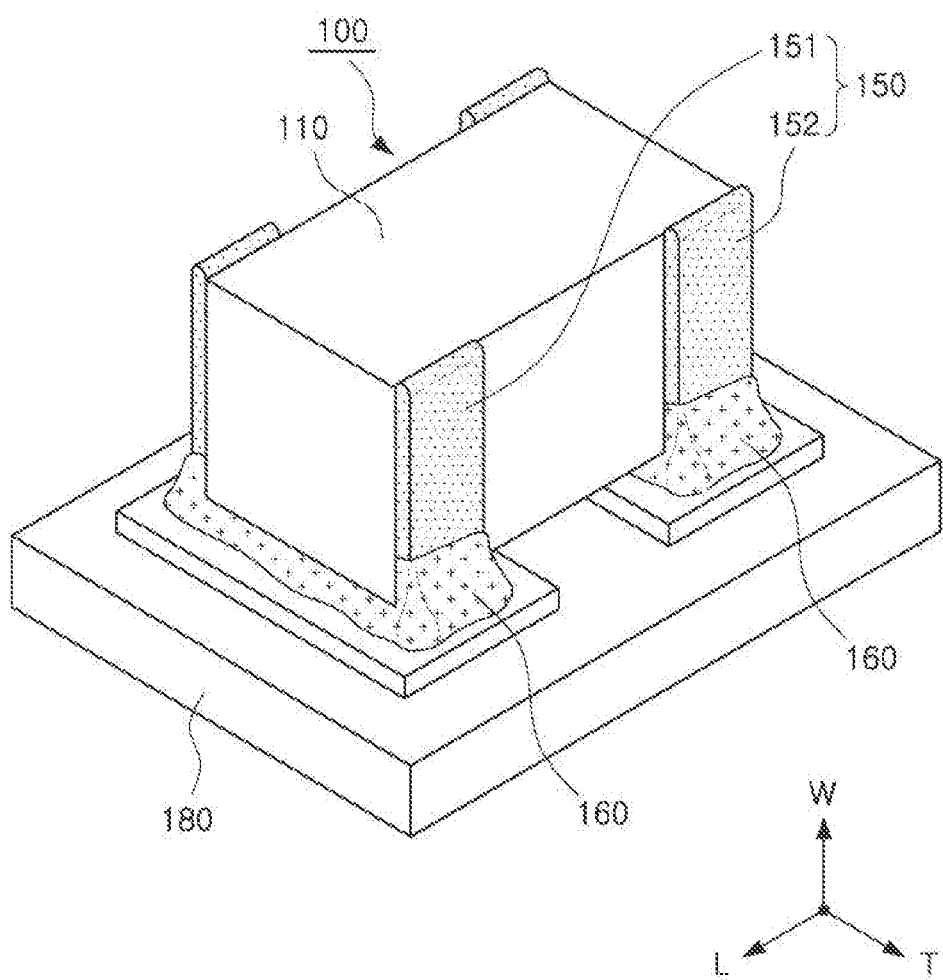
FIG. 7 is a perspective view schematically illustrating a capacitor mounted on a circuit board, according to an exemplary embodiment.

FIG. 7 is a perspective view schematically illustrating a capacitor according to an exemplary embodiment, mounted on a circuit board.

With reference to FIG. 7, plating layers 151 and 152 (e.g., plating layer 150) may be formed on the first external electrode 131, the second external electrode 132, and the dummy electrodes 140. A plating layer formed on an external electrode and a plating layer formed on a dummy electrode may be formed as a single connected layer, and a thickness thereof may be 1 μm to 10 μm.

The plating layer 150 may be formed to have a uniform thickness on surfaces of the first external electrode 131, the second external electrode 132, and the dummy electrodes 140. In other words, the plating layer 150 may extend from the second surface of the body to the third surface and the fourth surface thereof. Thus, an outside of the capacitor may be protected and adhesion strength with the circuit board may be improved.

The plating layers 151 and 152 may allow the circuit board 180 to be adhered to a solder fillet 160 when the capacitor is mounted on the circuit board 180.

The plating layers 151 and 152 may be formed of nickel (Ni), tin (Sn), or alloys thereof, but are not limited thereto.

Hereinafter, a method of manufacturing a capacitor according to an exemplary embodiment will be described.

Figure 6A:
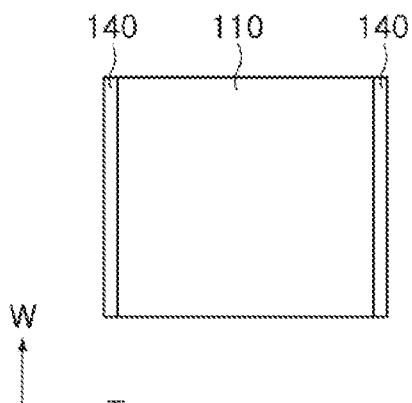
FIGS. 6A through 6C are side views schematically illustrating a method of manufacturing a capacitor according to an exemplary embodiment.
Figure 6B:
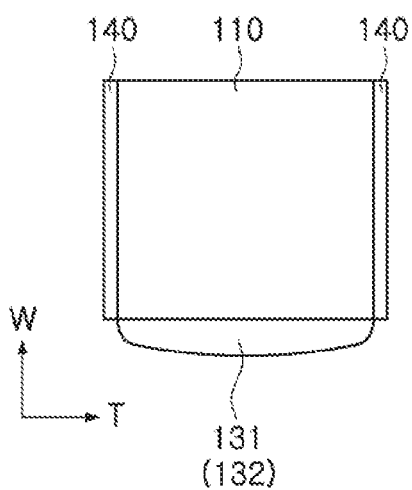
Figure 6C:
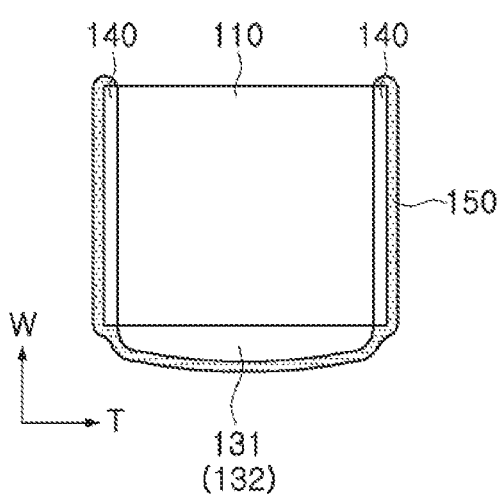

FIGS. 6A through 6C are a side view schematically illustrating a method of manufacturing a capacitor according to an exemplary embodiment.

With reference to FIGS. 6A through 6C, the method of manufacturing a capacitor according to an exemplary embodiment includes obtaining a body 110 having a first surface, a second surface, and a third surface and a fourth surface connecting the first surface to the second surface, in which a portion of an internal electrode pattern is exposed to the second surface, and in which dummy electrode patterns 140 are disposed on the third surface and the fourth surface, by stacking and sintering a plurality of dielectric layers on which the internal electrode pattern is formed, and coating the second surface of the body with external electrode pastes.

The stack may be formed by stacking a plurality of dielectric layers on which internal electrode patterns are formed in an upper portion, and a dielectric layer on which a dummy electrode pattern is formed in an upper portion, but is not limited thereto.

The dummy electrode pattern may be formed by coating the third surface and the fourth surface of the stack, on which a plurality of dielectric layers in which the internal electrode pattern is formed are stacked, with a conductive paste. The dielectric layer, on which the dummy electrode pattern is formed, may be a cover layer.

The internal electrode pattern is formed to be exposed to the second surface of the stack, and the dummy electrode patterns are disposed on the third surface and the fourth surface of the stack. Thereafter, the stack is sintered to obtain a body.

The external electrodes 131 and 132 may be formed by applying an external electrode paste to be electrically connected to an internal electrode pattern exposed to the second surface of the body.

The external electrode paste may be applied using an embossed jig and an engraved jig, or may be printed using a wheel type device or using a screen printing method.

After the external electrodes 131 and 132 are formed, the body and the external electrode are sintered to obtain a body 110 in which an external electrode is connected to an internal electrode.

With reference to FIG. 6A, a stack in which the dummy electrode patterns 140 are formed is sintered to obtain a body.

The dummy electrode patterns 140 may be formed, as the third surface and the fourth surface of the stack are coated with a conductive paste the same as that of the internal electrode pattern, using a screen printing method.

After the dummy electrode patterns are formed, the internal electrode pattern and the dummy electrode pattern are sintered simultaneously to obtain the body 110 in which the dummy electrode patterns are formed on the third surface and the fourth surface. The dummy electrode patterns are formed on both surfaces of the body.

The dummy electrode patterns 140 may extend from edges at which the second surface of the body meets the third surface and the fourth surface.

The dummy electrode patterns 140 are not electrically connected to the internal electrode, and may serve as a seed layer when a plating layer is to be formed thereafter.

Next, with reference to FIG. 6B, the body on which the dummy electrode patterns are formed is coated with external electrode pastes.

The external electrode pastes may be applied to edges at which the second surface of the body 110 meets the third surface and the fourth surface. In other words, the external electrode paste may be applied to the lower surface of the body.

The external electrode paste may be formed to be adjacent to the dummy electrode patterns 140.

Thereafter, the body 110, in which the external electrodes 131 and 132 are connected to the internal electrode through a sintering process, may be obtained.

Next, with reference to FIG. 6C, a plating layer 150 is formed on the body 110 in which the dummy electrode patterns 140 and the external electrodes 131 and 132 are formed.

The plating layer 150 may be formed along surfaces of the dummy electrode patterns 140 and the external electrodes 131 and 132. A plating layer formed on the dummy electrode pattern and a plating layer formed on the external electrode may be provided as a single layer.

In other words, the plating layer 150 may extend from the second surface of the body to the third surface and the fourth surface thereof.

The plating layer 150 may be formed of nickel (Ni), tin (Sn), or alloys thereof, but is not limited thereto.

As set forth above, according to exemplary embodiments in the present disclosure, in a capacitor, a dummy electrode is formed on a surface of a body to significantly increase capacitance and to improve adhesion strength with a circuit board when a capacitor is mounted on the circuit board, simultaneously. In addition, capacitor loading workability may be improved and convenience may be secured.

While exemplary embodiments have been shown and described above, it will be apparent to those skilled in the art that modifications and variations could be made without departing from the scope of the present invention as defined by the appended claims.

What is claimed is:

1. A method of manufacturing a capacitor comprising:
   forming a body having a first surface, a second surface, and a third surface and a fourth surface connecting the first surface to the second surface, in which a portion of an internal electrode pattern is exposed to the second surface, and in which dummy electrode patterns are disposed on the third surface and the fourth surface and are spaced apart from the internal electrode pattern, by stacking and sintering a plurality of dielectric layers on which the internal electrode pattern is formed; and
   after forming the dummy electrode patterns, coating the second surface of the body with external electrode paste to be connected to the portion of the internal electrode pattern, exposed to the second surface.

2. The method of manufacturing a capacitor of claim 1, wherein the dummy electrode patterns are formed of a conductive paste the same as that of the internal electrode pattern.

3. The method of manufacturing a capacitor of claim 1, wherein 10 µm≤La≤(Lt/2)−10 µm is satisfied, in which Lt is a length of the body and La are lengths of the dummy electrode patterns formed on edges at which the second surface of the body meets the third surface and the fourth surface.

4. The method of manufacturing a capacitor of claim 1, wherein 10 µm≤Wa≤Wt is satisfied, in which Wt is a width of the body and Wa are widths of the dummy electrode patterns.

5. The method of manufacturing a capacitor of claim 1, wherein the external electrode paste is applied to edges at which the second surface of the body meets the third surface and the fourth surface.

6. The method of manufacturing a capacitor of claim 1, wherein the dummy electrode patterns are formed to have at least one of a triangular shape, a rectangular shape, and a trapezoidal shape.

7. The method of manufacturing a capacitor of claim 1, wherein among the dummy electrode patterns, the dummy electrode pattern formed on the third surface and the dummy electrode pattern formed on the fourth surface have different shapes.

8. The method of manufacturing a capacitor of claim 1, wherein the coating of the external electrode paste is performed after the sintering of the plurality of dielectric layers.

9. A method of manufacturing a capacitor comprising:
forming a body having a first surface, a second surface, and a third surface and a fourth surface connecting the first surface to the second surface, in which a portion of an internal electrode pattern is exposed to the second surface, and in which dummy electrode patterns are disposed on the third surface and the fourth surface, by stacking and sintering a plurality of dielectric layers on which the internal electrode pattern is formed; and
coating the second surface of the body with external electrode paste to be connected to the portion of the internal electrode pattern, exposed to the second surface,
wherein the coating of the external electrode paste is performed after the formation of the dummy electrode patterns and the sintering of the plurality of dielectric layers.

10. The method of manufacturing a capacitor of claim 9, wherein the dummy electrode patterns are formed of a conductive paste the same as that of the internal electrode pattern.

11. The method of manufacturing a capacitor of claim 9, wherein 10 µm≤La≤(Lt/2)−10 µm is satisfied, in which Lt is a length of the body and La are lengths of the dummy electrode patterns formed on edges at which the second surface of the body meets the third surface and the fourth surface.

12. The method of manufacturing a capacitor of claim 9, wherein 10 µm≤Wa≤Wt is satisfied, in which Wt is a width of the body and Wa are widths of the dummy electrode patterns.

13. The method of manufacturing a capacitor of claim 9, wherein the external electrode paste is applied to edges at which the second surface of the body meets the third surface and the fourth surface.

14. The method of manufacturing a capacitor of claim 9, wherein the dummy electrode patterns are formed to have at least one of a triangular shape, a rectangular shape, and a trapezoidal shape.

15. The method of manufacturing a capacitor of claim 9, wherein among the dummy electrode patterns, the dummy electrode pattern formed on the third surface and the dummy electrode pattern formed on the fourth surface have different shapes.

16. A method of manufacturing a capacitor comprising:
forming a body having a first surface, a second surface, and a third surface and a fourth surface connecting the first surface to the second surface, in which a portion of an internal electrode pattern is exposed to the second surface, and in which dummy electrode patterns are disposed on the third surface and the fourth surface, by stacking and sintering a plurality of dielectric layers on which the internal electrode pattern is formed;
after forming the dummy electrode patterns, coating the second surface of the body with external electrode paste to be electrically connected to the portion of the internal electrode pattern, exposed to the second surface; and
forming a plating layer to cover the external electrode paste and one of the dummy electrode patterns so as to connect the external electrode paste and the one of the dummy electrode patterns to each other.

17. The method of manufacturing a capacitor of claim 16, wherein the dummy electrode patterns are formed of a conductive paste the same as that of the internal electrode pattern.

18. The method of manufacturing a capacitor of claim 16, wherein 10 µm≤La≤(Lt/2)−10 µm is satisfied, in which Lt is a length of the body and La are lengths of the dummy electrode patterns formed on edges at which the second surface of the body meets the third surface and the fourth surface.

19. The method of manufacturing a capacitor of claim 16, wherein 10 µm≤Wa≤Wt is satisfied, in which Wt is a width of the body and Wa are widths of the dummy electrode patterns.

20. The method of manufacturing a capacitor of claim 16, wherein the external electrode paste is applied to edges at which the second surface of the body meets the third surface and the fourth surface.

* * * * *